March 10, 1925.
W. H. GRUENHAGEN
FISH SCALER
Filed March 8, 1924
1,529,062
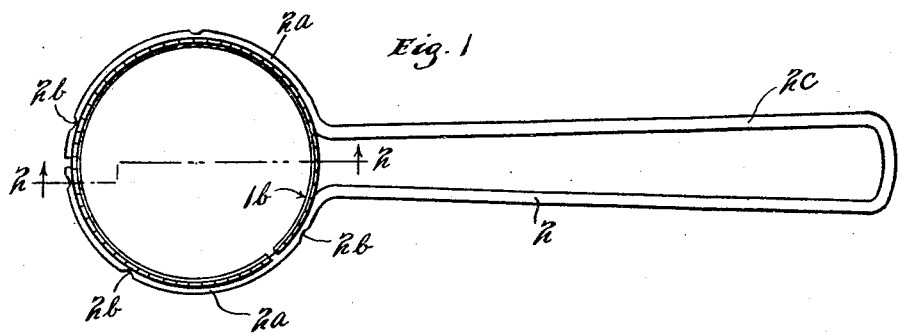
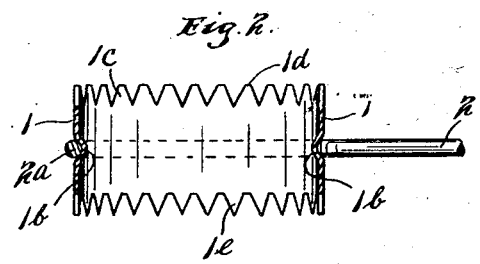
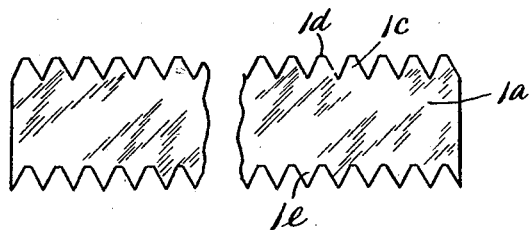
INVENTOR
WILLIAM H. GRUENHAGEN.
BY HIS ATTORNEY.
James F. Williamson Patented Mar. 10, 1925.

1,529,062

UNITED STATES PATENT OFFICE.

WILLIAM H. GRUENHAGEN, OF ST. PAUL, MINNESOTA.

FISH SCALER.

Application filed March 8, 1924. Serial No. 697,747.

*To all whom it may concern:*

Be it known that I, WILLIAM H. GRUENHAGEN, a citizen of the United States, residing at St. Paul, in the county of Ramsey and State of Minnesota, have invented certain new and useful Improvements in Fish Scalers; and I do hereby declare the following to be a full, clear, and exact description of the invention, such as will enable others skilled in the art to which it appertains to make and use the same.

This invention relates to a scraping device adapted especially to be used as a fish scaling implement. It is desirable in the fish scaling operation to have a simple, rigid toothed device adapted readily to engage and remove the scales from the fish. It is also desirable in cleaning a fish to scrape the same well after the scales are removed in order to clean the skin of any dirt adhering thereto.

It is an object of this invention to provide a fish scaling implement having two sets of teeth, the teeth of one set being sharp and particularly adapted to engage and remove the scales, the teeth of the other set being quite blunt so as to function as a scraping implement.

It is a further object of the invention to provide a novel, simple and efficient fish scaling implement having oppositely disposed teeth formed on opposite sides of a sheet metal plate, preferably bent into annular form.

It is also an object of the invention to provide a simple and efficient method of constructing such an implement.

These and other objects and advantages of the invention will be fully set forth in the following description made in connection with the accompanying drawings in which like reference characters refer to the same parts throughout the different views, and in which, Fig. 1 is a plan view of the device;

Fig. 2 is a vertical section taken on the line 2—2 of Fig. 1, as indicated by the arrows; and Fig. 3 is a plan view of the blank forming the scraping element of the device.

Referring to the drawings, the device comprises a plate 1, preferably formed from sheet metal. In constructing the implement, said plates are cut from a serrated strip of metal $1^a$. The strips $1^a$ are made by successively feeding a sheet of metal between serrated dies. Preferably, the set of teeth $1^c$ of one side of said strip are formed with straight transverse portions $1^d$ at their pointed ends, while the teeth $1^e$ at the other side of the strip are formed with sharp points. To so form the strips, two sets of dies would, of course, be provided. The strips $1^a$ are thus provided with the teeth as they are cut from the sheet and said strips are then cut into suitable lengths. The serrated strips or the short lengths cut therefrom are then provided with a groove substantially semi-circular in form, indicated as $1^b$ in Fig. 2. The short strips are now bent into annular and preferably circular form, the convex side of groove $1^b$ being directed inwardly. A handle 2 is constructed of simple wire or rod-like material having a substantially U-shaped portion, the ends of which are bent into semi-circular portions $2^a$ extending approximately about a common center and in the same plane as the U-shaped portion $2^b$ of the handle. The handle portion, preferably, will be made of metal which is somewhat resilient. The handle portions $2^a$ are now engaged about the plate 1, the portions $2^a$ fitting in the groove $1^b$ of the plate. With the parts so engaged, the handle portions $2^a$ and plate 1 are spot-welded together at spaced points, indicated as $2^b$ in Fig. 1. Plate 1 and handle 2 are thus firmly secured together, and if desired, these parts may be plated or coated in any suitable manner with tin or other non-corrosive coating.

In operation, the device will be held in the hand by the handle 2 and the scales removed from the fish by scraping over the fish with the pointed teeth $1^e$. The points of the teeth will readily engage under the scales and the same efficiently can be removed. After the scales have practically all been removed, the device can be turned over and the teeth $1^c$ used to scrape the fish and complete the cleaning thereof. The teeth $1^c$ will also be found efficient in cleaning fish not having scales, such as cat fish.

From the above description it is seen that applicant has provided a very simple and efficient fish scaling device and method of making the same. The strips $1^a$ are quickly and efficiently cut from the sheet and the device is easily and quickly assembled. A simple and inexpensive device is thus produced. After the handle 2 and plate 1 are secured together, a very strong and durable device is formed. The device has been successfully demonstrated in actual practice and is meeting with much commercial success.

It will, of course, be understood, that various changes may be made in the form, details, and proportions of the parts, as well as in the steps and sequence thereof in the method without departing from the scope of applicant's invention, which, generally stated, consists in a method and apparatus capable of carrying out the objects above stated, such as shown and described and defined in the appended claims.

What is claimed is:

1. A fish scaling device comprising a piece of sheet material having oppositely disposed teeth at opposite sides thereof, the teeth at one side having sharp points and the teeth at the other side, having short transverse outer edges to form a scraping implement.

2. A fish scaling device comprising an annular plate having oppositely directed teeth formed on its opposite edges, said plate having an inwardly directed groove adjacent its central portion and a wire or rod handle embracing said plate disposed in said groove and secured therein.

3. A fish scaling device comprising an annular sheet metal plate having oppositely directed teeth formed on its opposite edges and a handle having its ends of semi-circular form embracing and secured to said plate between said teeth, and having a U-shaped portion projecting at one side of said plate.

4. A fish scaling device comprising an annular plate having teeth cut therein at its opposite edges, the teeth on one edge having sharp points and the teeth at its other edge having short transverse outer edges disposed in a plane normal to the axis of said annular member, said member having a handle embracing the same intermediate its edges and extending at one side thereof.

In testimony whereof I affix my signature.

WILLIAM H. GRUENHAGEN.